United States Patent [19]
Bannach Sichtermann et al.

[11] Patent Number: 5,772,730
[45] Date of Patent: Jun. 30, 1998

[54] PROCESS FOR SEPARATING CONTAMINANTS FROM ORGANIC PHASES DURING HYDROMETALLURGICAL EXTRACTION OF METALS

[75] Inventors: Gustavo Holger Bannach Sichtermann, Santiago; Aliro Teodoro Nelson Pincheira Alvarez, Chuquicama; Andres Antonio Reghezza Inzunza, Chuquicama; Alberto Segundo Cruz Rivera, Chuquicama; Gino Salvador Slanzi Guerra, Chuquicama; Ernesto Otmardo Riedel Hohmann, Chuquicama; Elias Ahmed Yuri Spataris, Calama, all of Chile

[73] Assignee: Corporacion Nacional Del Cobre De Chile, Santiago, Chile

[21] Appl. No.: 49,736

[22] Filed: Apr. 19, 1993

[30] Foreign Application Priority Data

Apr. 20, 1992 [CL] Chile .......................................... 378-92

[51] Int. Cl.$^6$ ...................................................... C21B 9/00
[52] U.S. Cl. ............................. 75/710; 208/187; 210/634
[58] Field of Search ................................... 208/187, 188; 210/DIG. 5, 634; 75/710

[56] References Cited

U.S. PATENT DOCUMENTS 4,290,882 9/1981 Dempsey ............................... 210/634

OTHER PUBLICATIONS

E. Barnea, Dec. 1979, "Liquid–liquid contacting—art or science? Part I. Characterization of liquid–liquid systems", *Hydrometallurgy* 5:15–28.

Charles & Mason, Dec. 1960, "The mechanism of partial coalescence of liquid drops and liquid/liquid interfaces", *J. of Colloid Sci.* 15:105–122.

Jefferys & Davies, Dec. 1971, "Coalescence of liquid droplets and liquid dispersion", *Recent Advances in Liquid–Liquid Extraction* Chap. 14 pp. 495–584.

Laddha & Degaleesan, Dec. 1982, "Dispersion and coalescence" *Handbook of Solvent Extraction* Lo et al. Eds. Chap. 4 pp. 125–149.

S. B. Lang, Dec. 1962, "A hydrodynamic mechanism for the coalescence of liquid drops", Dissertation pp. 75–98.

MacKay & Mason, Dec. 1961, "The Marangoni Effect and liquid/liquid coalescence", *Nature* 191:488.

Mencho & Zivkovic, Dec. 1994, "Emulsion formation and its control in solvent extraction plants", *Meeting of the Southern Hemisphere on Mineral Technology* 3:163–182.

Menacho et al., Dec. 1995, "Solvent extraction recovery of copper", *Short Course at the Copper '95 int. Conference, Santiago, Chile* pp. 1, 32–34.

Morrison & Boyd, Dec. 1976, *Organic Chemistry* NYU Pub. pp. 1155.

Nielsen et al., Dec. 1958, "Coalescence of liquid drops at oil–water interfaces", *J. of Colloid Sci.* 13:441–458.

Ritcey & Ashbrook, Dec. 1984, *Solvent extraction—Principles and applications to process metallurgy–Part I* Elsevier Pub. Chap. 5 pp. 207–229.

(List continued on next page.)

Primary Examiner—Scott Kastler
Attorney, Agent, or Firm—Pennie & Edmonds LLP

[57] ABSTRACT

A method of removing aqueous phase residues and other contaminants from the organic phase used in hydrometallurgical extraction processes comprises passing the organic phase through a column or other vessel in which a porous bed of elements of suitable size and shape to permit flow therethrough is provided. The material making up the bed elements may be polyethylene, polypropylene, nylon, teflon, stainless steel, plastics in general and their derivatives, or combinations thereof. The aqueous phase coalesces on the surfaces of the materials making up the bed and forms droplets which drop to the bottom of the column or vessel which are thereafter removed.

22 Claims, 1 Drawing Sheet

OTHER PUBLICATIONS

Sareen et al., Dec. 1966, "Coalescence in fibrous beds", *A.I.Ch.E. J.* 12:1045–1050.

Spielman & Goren, Dec. 1972, "Theory of coalescence by flow through porous media", *Ind. Eng. Chem Fundam.* 11:66–72.

Spielman & Goren, Dec. 1972, "Experiments in coalescence by flow through fibrous mats", *Ind. Eng. Chem. Fundam.* 11:73–83.

Vijayan et al., Dec. 1975, "Drop/drop and drop/interface coalescence in primary liquid/liquid dispersion separators", *Chem. Eng. Tech.* 47:748–755.

Vijayan et al., Dec. 1976, "The effect of temperature on coalescence of liquid drops at liquid/liquid interfaces", *Can. J. of Chem. Eng.* 54:269–278.

EIMCO Process Equipment Co, Salt Lake City, UT. (Brochure) "Wemco Pacesetter™ Separators". Dec. 1992.

Highland Tank & Mfg. Co., Stoystown, Pa. (Brochure) "O/A Highland Tank Separator". Dec. 1992.

McTighe Ind., Mitchell, SD. (Brochure) "Mc Tighe Industries Separator", Petro Pak™ Information. Dec. 1992.

Spin Tek, Long Beach, CA. Application Bulletin SPIN193 (Brochure) "SX Filters: For Organic–Free and Filtered Electrolyte". Dec. 1992.

SpinTek, Long Beach, CA. Application Bulletin SPIN293 (Brochure) "MATRIX™ Tower: For 75% Organic Recovery from Electrolyte without Air Injection". Dec. 1992.

SpinTek, Long Beach, CA. Application Bulletin SPIN393 (Brochure) "COMATRIX™ Tower: Excellent Organic Recovery, Plus 5x Flow Rate of Standard SX Filters". Dec. 1992.

SpinTek, Long Beach, CA. Application Bulletin SPIN493 (Brochure) "Testing of CoMatrix™ Tower for Organic Removal and Filtration of Electrolyte". Dec. 1992.

Hsu et al., Membrane Recovery in Liquid Membrane Separation Process, *Separation Science and Technology*, 20 (2&3), pp. 115–130 Dec. 1985.

Orrell, An Assessment of the Coalescing Abiliy of API Filter Coalescer Elements in Current Aviation Fueling Service, *Filtration and Separation* . JULY/August 1981, pp. 301–304.

Gorski et al., Removal of Water From Fuels For Aircraft Turbine Engines by the Coalscene method, *Tech. Lotnicza Astonaut* . 38(3), pp. 23–29 Dec. 1983.

Orrell, An Assessment of the Coalescing Ability of API Filter Coalescer Elements in Current Aviation Fueling Service, *Filtration and Separation*, Jul./Aug. 1981, pp. 301–304.

Gorski, et al., Removal of Water from Fuels for Aircraft Turbine Engines by the Coalescence Method, *Tech. Lotnicza Astronaut*. 38(3), pp. 23–29 Dec. (1983).

5,772,730

PROCESS FOR SEPARATING CONTAMINANTS FROM ORGANIC PHASES DURING HYDROMETALLURGICAL EXTRACTION OF METALS

TECHNICAL FIELD

This invention relates generally to the field of hydrometallurgical extraction of metals and more particularly to the separation of aqueous residues or other contaminants from an organic phase during solvent extraction of metals such as copper.

BACKGROUND OF THE INVENTION

In industrial extraction processes, residue from one phase of an extraction is typically carried over into the other phase. Such residues are typically present as micro-drops which fail to separate within the decanting vessels used for the extraction, or as residues of solids and other contaminants. The residue levels depend on a variety of factors, particularly the type and concentration of the active reagent in the solvent, the degree of agitation and the diameter of the agitator drive, the presence of solids in the feed stock, the continuity of the phases and the temperature, in addition to other significant variables well known in the art.

When copper is extracted, of particular importance are the aqueous residues which remain in the charged organic phase, inasmuch as when the charged organic phase advances to the reextraction stage, the electrotwinning electrolyte is gradually contaminated. Impurities often present in these residues include Fe, Mn, Cl, $NO_3$, $SiO_2$ and Al. Such contamination directly affects the system operating costs as well as the cathodic quality of the final product.

In other types of extraction operations involving copper, aqueous phase contamination can cause contamination of the final product, thus leading to an undesirable increase in the operating costs for the process. The more impure the solutions are which feed into the extraction, the greater the impact on the operating costs.

In extraction operations in which it is necessary to operate in both acid and alkaline cycles respectively, steps for the intermediate washing of the organic phase have to be incorporated between these cycles to minimize the impact caused by the residues of aqueous phases as the organic passes from the acid cycle and vice-versa. Such washing steps significantly increase both the investment and operating costs for the system. Nevertheless, the inclusion of such intermediate treatment steps is common practice in uranium extraction as well as in the case of copper, where the extraction stage is carried out in an ammoniacal alkaline medium and the reextraction stage is carried out in an acid medium. A similar situation occurs with hydrometallurgical treatment of copper concentrates in a hydrochloric acid medium, where a significant amount of chlorine contamination is transmitted through the residues to the reextraction stage.

In other hydrometallurgical extraction operations, the transfer of electrolyte residues from the reextraction to the extraction stage can significantly affect the pH in the extraction stage, whereby the efficiency of extraction and, consequently, production can diminish. Additionally, any electrolyte lost as residue further adds to the cost of the process.

The presence of Fe (III) decreases the current efficiency; manganese can be oxidized to permanganate in the anode, whereby when the spent solution returns to extraction, the organic phase may be degraded.

Moreover, when it oxidizes in the anode, the potential for oxidation of the aqueous solution increases, thus increasing the amount of gaseous chlorine liberated in the electrolytic vessel, leading to a resultant increase in environmental contamination.

Nitrate ions also contribute to greater anode corrosion. Due to its low solubility in highly acidic solutions, $SiO_2$ passing over to the electrolyte can subsequently precipitate and lead to greater formation of residue commonly referred to in the art as "crud". The presence of $SiO_2$ and Al together increase the viscosity of the electrolyte, thus affecting the transport properties in the electrolytic process.

The contamination level of the electrolyte can become critical, particularly when sea water is used as the leaching agent. Some mining installations, e.g., the Tocopilla and Lince Mining companies in Chile, have been forced to incorporate an additional washing stage to treat the charged organic phases in an additional decanting mixer, thus increasing both their investment and operating costs. This additional washing of the organic phase before the reextraction stage has been necessitated by the high residue level and high level of impurities in the solutions feeding the extraction.

World-wide, the levels of aqueous residues found in the charged organic during the hydrometallurgical extraction of copper fluctuate between 100 and 800 ppm, depending on the operating conditions. In specific cases, such as where a high concentration of reagent is used in the operation, these residues can exceed 1,000 ppm. A common technique for maintaining acceptable levels of impurities in the electrolyte comprises periodically purging a determined volume. The major disadvantage of this technique is that it often results in the undesirable discharge of copper, cobalt and additives from the cycle.

Another method of removing an aqueous residue from an organic phase is for the organic phase to undergo an extended period of decanting, which, however, prohibitively increases both the production rate and the inventory of organic in the plant. Although centrifuging is a technically feasible alternative, the investments involved limit the application of this technique to small-scale, low production rate processes.

SUMMARY OF THE INVENTION

Accordingly, the present invention is directed to an inexpensive, reliable method for separating aqueous material from an organic phase in hydrometallurgical extraction plants. Moreover, the presently described process is additionally capable of removing, from the organic phase, solids and/or crud or other contaminants. For convenience in describing the invention, the aqueous material, the "crud" and the other contaminants noted above are referred to collectively herein as "contaminants" or "contaminating residues".

In accordance with the present invention, a method of filtering aqueous material and/or other contaminants from the organic phase (i.e., referred to herein as the "contaminated" organic phase) comprises passing the contaminated organic phase through a bed of material to facilitate coalescence of micro-drops of aqueous material upon the bed and then subsequently decanting the remaining, i.e. filtered, solution. The bed through which the contaminated organic phase containing the residues passes is comprised, for example, of strings, netting, shavings, fragments, spheres, spirals, twists, scraps or some body of similar form, formed of one or more of materials that are compatible with the organic phase. Depending on such features as the opening size, the apparent density and the thicknesses (i.e., when netting is used to form the bed) and otherwise generally on the granulometry of the material, any desired specific flow rate (i.e., the volume of organic phase that goes through the coalescing bed per unit of area and time) can be obtained by one of ordinary skill in the art.

The bed may be installed within any suitable container means e.g., a column, having an inlet for introducing the contaminated organic phase and an outlet for removing the resultant "filtered" organic phase after separation of the contaminants.

The equipment required to carry out the process thus comprises vessel means that contains the bed-forming material, which vessel means may, as noted above, typically comprise one or more columns of various shapes and/or sizes. Depending on the required capacities for removing the aqueous material, various configurations of liquid circuits can be established, in which the columns can operate in series, in parallel, or in series-parallel, in such a way that a substantially total removal of the trapped aqueous phase and/or other contaminants can be achieved.

In alternate embodiments of the invention, a coalescing bed in the form, e.g., of a net can be incorporated, for example, into the spillways for the organic phase in the decanters, in the charged organic accumulator, in the vessels that convey the organic phase, or in other vessels suitable for this purpose.

DETAILED DESCRIPTION OF THE INVENTION

Figure 1:
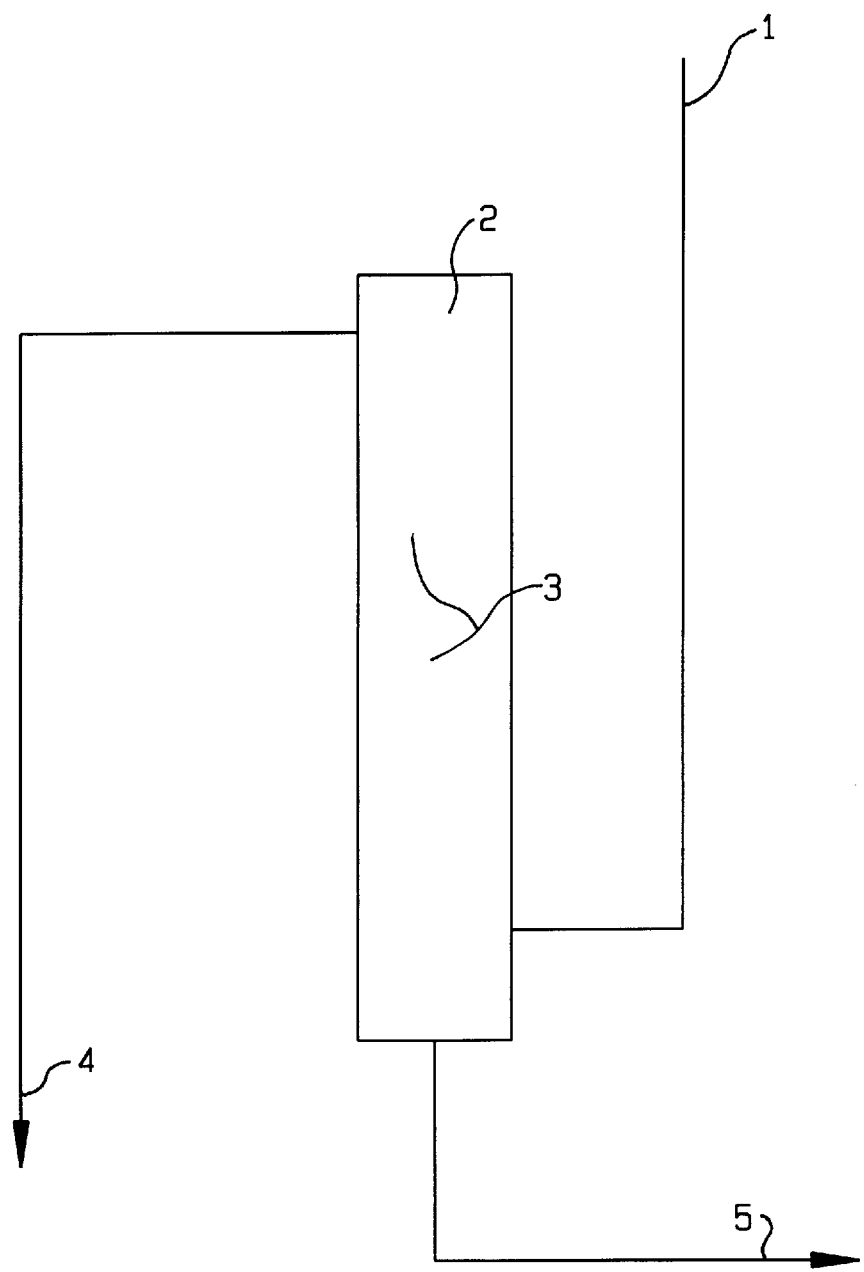
FIG. 1 is a flow chart illustrating a preferred embodiment of the process of the present invention.

As illustrated in FIG. 1, a stream of contaminated organic material 1 containing, for example, an aqueous residue is fed by gravity or by pumping into the lower part of a column or other container means 2. Stream 1 may be fed through the column in continuous or batch fashion, depending upon the desired production rate and volumetric capacity of the container means utilized for a particular application.

As those skilled in the art will recognize, the precise dimensions and geometric configuration of container means 2 are not critical and may vary in accordance with the desired flow rate and volumetric capacity. Accordingly, container means 2 may have a circular, polygonal, or irregular cross section as desired. In the illustrated embodiment, container means 2 is provided in the form of a vertical column having an inlet proximate its lower end for introducing the mixture containing the contaminated organic phase, and an outlet proximate its upper end for removing the filtered organic phase.

Depending on the amount of organic phase being filtered, various configurations of liquid circuits can be established. For example, instead of a single large column, two or more columns may be operated in series with the second being located downstream, i.e., in the direction of the liquid flow, from the first, or in parallel, or in series-parallel, in such a way that a total removal of the trapped aqueous phase and/or other contaminants can be achieved.

The separation of the aqueous and organic phases which occurs within column 2 will now be described in further detail. As noted above, however, the presently described process can also effectively remove, e.g., other contaminants such as dispersed solids and/or "crud" from the organic phase.

A bed 3 made up of strings, netting, shavings, fragments, spheres, scraps or other objects having a variety of configurations is arranged within column 2 to define a labyrinth of surfaces upon which coalescence of the aqueous material may take place. Depending on the apparent densities of the bed elements (i.e. the degree of compaction) or, alternately, the thicknesses and openings of the nets, and in general on the granulometry of the bed material, the flow rate can be varied as desired. As would be well understood by one skilled in the art, the apparent density of the bed is affected by the type of material used and its real density, the grain size of the material, the porosity and degree of compaction in the bed, and the shape of the material used (i.e., threads, webbing, shavings, etc.). Bed 3 should have a low apparent density so as to maximize the surface area of the bed elements exposed to the passage of liquid stream 1 therethrough.

An optimal apparent density for a given specific flow rate exists for each type of material used to form the bed. To obtain an efficient system response, the apparent density is complemented by the height of the bed, which preferably varies between 2 and 5 times its diameter. Preferably, the system has an apparent density in the range of 0.02 to 0.20 gr/cc. In this range, specific flow rates will fluctuate between 8 and 30 $m^3/hr \times m^2$. The system is perfectly capable of operating outside of these preferred ranges, however.

The objects comprising the bed may be formed, as noted above, from any materials compatible with the organic phase. These materials include, as non-limiting examples, polyethylene, polypropylene, polystyrene, polyvinyl chloride, teflon, stainless steel, other metals and their alloys, plastics, acrylic, ceramics and glasses. One of ordinary skill in the art would thus be readily be able to choose an appropriate material simply based upon knowledge of the compatibility of the liquid stream with the bed material.

As the organic material 1 flows upwardly through bed 3 of the column, micro-drops of aqueous material 5 coalesce on the surfaces of the bed elements, with these drops continuing to increase in size until a point at which they detach and drop to the bottom of the column. The formation of these drops and their separation from the bed elements occurs more readily at higher temperatures than at lower temperatures. The aqueous material 5 can then be removed from the column in batches or continuously. In the bottom of the column, drops will not be present until they have coalesced and formed an aqueous phase. This liquid can be purged continually through a suitable valve (not shown) by regulating the exit flow at a rate corresponding to the rate of aqueous formation.

Depending on the efficiency with which the aqueous material is filtered during treatment in a single column, more than one column may be utilized; i.e., in series, in parallel, or in series-parallel combination, to effect a substantially total removal of the residual aqueous phase and/or other contaminants from the organic phase. When a loss of efficiency in the column is detected because solids or other foreign material have been trapped therein, the operation of one column can be discontinued in order to permit backwashing. Alternatively, the contents of the filtration bed 3 may be removed and replaced with clean filter material before resuming the filtration process in that column.

Trapping of the aqueous phase will occur at any specific flow rate of the organic through the bed, although the efficiency of the removal of aqueous from the organic phase will vary. For a given size, efficiency will decrease as the flow rate increases. Maximum levels of aqueous removal have been obtained with a specific flow in the range of 8 to 30 $m^3/hr \times m^2$.

The organic phase 4, now substantially free of residues of aqueous material and other contaminants, may be utilized in the normal fashion once it exits column 2. To facilitate the efficient removal of the residues and solids or other contaminants, it is preferred that the material forming the bed be previously wetted with water or a suitable aqueous solution.

EXAMPLES

The embodiments described herein and the specific examples of the present invention provided below are presented only for purposes of illustrating the principles of the present invention. Accordingly, the present invention is not to be limited solely to the exact configuration, examples and steps as illustrated and set forth below.

EXAMPLE NO. 1

In this example, the presently disclosed process was implemented in a pilot extraction plant with a capacity of 0.5 gallons per minute by the Chuquicamata division of Codelco-Chile.

For treating the contaminated organic, an acrylic column was used in which the charged organic was fed through the lower lateral part of the column, gradually proceeding to the removal of the aqueous material accumulated in the bottom and below the feed line.

Different types of materials were evaluated as coalescing (i.e., bed forming) agents.

A summary of the operating conditions used and the results obtained are presented in Table No. 1. These results demonstrate that all the types of materials evaluated are capable of removing the aqueous phase trapped within the organic stream with greater or lesser efficiency depending on the operating conditions.

TABLE NO. 1

EVALUATION OF COALESCING AGENTS FOR THE REMOVAL OF AQUEOUS RESIDUES FROM THE ORGANIC PHASE

| Type of coalescent | Apparent Density of the Material in the Column (gr/cc) | Height/ Diameter Ratio - Coalescing Column | Specific Organic Flow with Residues ($m^3/hr \times m^2$) | Operation Time - Column (hours) | Removal of Residues from the Organic (ppm) | Residence Time in Column (minutes) | Specific Area ($cm^2/g$) |
|---|---|---|---|---|---|---|---|
| Strips of High Density Polyethylene in the Form of Spirals | 0.06 | 3.1 | 9.53 | 13 | 624 | 1.76 | 38 |
| Mixture of Polypropylene Net with Stainless Steel | 0.18 | 2.0 | 9.06 | 5 | 936 | 1.19 | — |
| Marienberg Netting (Commercial Product) | 0.05 | 2.0 | 8.21 | 12 | 1,149 | 1.32 | — |
| Polypropylene Balls (Used in Electro-Winning) | 0.10 | 2.0 | 10.31 | 9 | 511 | 1.05 | 47 |
| Polypropylene Balls (Used in Electro-Winning) | 0.10 | 3.1 | 9.44 | 15 | 1,143 | 1.78 | 47 |
| High density polyethylene in the Form of Shavings - sawmill type | 0.14 | 2.0 | 9.50 | 120 | 885 | 1.15 | — |
| High Density Polyethylene in the Form of Spirals | 0.06 | 2.0 | 16.90 | 96 | 1,192 | 0.63 | 38 |
| Teflon Netting (Used in Acid Plants) | 0.09 | 2.0 | 9.53 | 9 | 697 | 1.13 | — |

EXAMPLE NO. 2

This example was also carried out in a solvent extraction pilot plant with a capacity of 0.5 gallons per minute.

In this example, the organic stream was fed to a first column 0.065 meters in diameter with a capacity of one liter. After passing through the first column, the stream was then fed to a second column in series with the first, measuring 0.09 meters in diameter with a capacity of 2.5 liters for the substantial removal of any residues still present therein.

The operating conditions and the results obtained are presented in Tables 2, 3 and 4 below. These results demonstrate the feasibility of totally removing the residual aqueous phase in the charged organic by suitably regulating the operating conditions and by using an appropriate number of columns.

TABLE NO. 2

EVALUATION OF THE PROCESS IN A PILOT PLANT HAVING A CAPACITY OF 0.5 GALLONS PER MINUTE

| | |
|---|---|
| Average specific flow | 15.18 m$^3$/hr × m$^2$ |
| Column diameter | 0.065 meters |
| Height of bed | 0.25 meters |
| Type of filler (i.e., bed) material | polyester (material used to form filters used in lateral walls of refineries) |
| Apparent density | 0.05 gr/cc |

| HOURS OF OPERATION | AQUEOUS RESIDUES IN ORGANIC ENTRANCE | AQUEOUS RESIDUES IN ORGANIC EXIT | AQUEOUS REMOVAL (%) |
|---|---|---|---|
| 2 | 1,500 | 100 | 99.33 |
| 4 | 2,000 | 100 | 95.00 |
| 6 | 1,500 | 100 | 93.33 |
| 8 | 1,400 | 200 | 85.71 |
| 10 | 1,500 | 100 | 93.33 |
| 12 | 1,300 | 100 | 92.31 |
| 14 | 1,400 | 100 | 92.86 |
| 16 | 1,500 | 100 | 93.33 |
| 18 | 1,200 | 100 | 91.67 |
| 20 | 600 | 0 | 100.00 |
| 22 | 400 | 0 | 100.00 |
| 24 | 1,000 | 100 | 90.00 |
| 26 | 1,100 | 200 | 81.82 |
| 28 | 800 | 100 | 87.50 |

TABLE NO. 3

EVALUATION OF THE PROCESS IN A PILOT PLANT HAVING A CAPACITY OF 0.5 GALLONS PER MINUTE

| | |
|---|---|
| Average specific flow | 16.5 m$^3$/hr × m$^2$ |
| Column diameter | 0.065 meters |
| Height of bed | 0.25 meters |
| Type of filler (i.e., bed) material | teflon netting (material used in acid plants) |
| Apparent density | 0.09 gr/cc |

| HOURS OF OPERATION | AQUEOUS RESIDUES IN ORGANIC ENTRANCE | AQUEOUS RESIDUES IN ORGANIC EXIT | AQUEOUS REMOVAL (%) |
|---|---|---|---|
| 2 | 1,200 | 100 | 91.67 |
| 4 | 500 | 100 | 80.00 |
| 6 | 400 | 0 | 100.00 |
| 8 | 1.200 | 100 | 91.67 |
| 10 | 1,000 | 100 | 90.00 |
| 12 | 500 | 100 | 80.00 |
| 14 | 1,000 | 100 | 90.00 |
| 16 | 1,800 | 200 | 88.89 |
| 18 | 1,100 | 100 | 90.91 |
| 20 | 2,500 | 0 | 100.00 |

TABLE NO. 4

EVALUATION OF THE PROCESS IN A PILOT PLANT HAVING A CAPACITY OF 0.5 GALLONS PER MINUTE

| | |
|---|---|
| Average specific flow | 9.02 m$^3$/hr × m$^2$ |
| Column diameter | 0.09 meters |
| Height of bed | 0.40 meters |
| Type of filler (i.e., bed) material | teflon netting (used in acid plants) |
| Apparent density | 0.09 gr/cc |

| HOURS OF OPERATION | AQUEOUS RESIDUES IN ORGANIC ENTRANCE | AQUEOUS RESIDUE IN ORGANIC EXIT | AQUEOUS REMOVAL (%) |
|---|---|---|---|
| 1 | 917 | 20 | 97.82 |
| 2 | 740 | 60 | 91.89 |
| 3 | 775 | 63 | 91.87 |
| 4 | 625 | 75 | 88.00 |
| 5 | 1,425 | 225 | 84.21 |
| 6 | 950 | 50 | 94.74 |
| 7 | 540 | 0 | 100.00 |
| 8 | 583 | 67 | 88.51 |
| 9 | 1,200 | 92 | 92.33 |
| 10 | 1,033 | 108 | 89.55 |
| 11 | 1,117 | 208 | 81.38 |
| 12 | 1,233 | 142 | 88.48 |
| 13 | 1,333 | 25 | 98.12 |
| 14 | 683 | 25 | 96.34 |

EXAMPLE NO. 3

Was carried out in a pilot plant for the solvent extraction of copper having a capacity of 50 gallons per minute. The process was implemented with two columns operating in series.

The bed material used in the column was made up of spiral strips of high density polyethylene. The degree of compaction of the HDPE in the column was such that the apparent density reached a value of 0.05 t/m$^3$.

The operating conditions for the two columns in series are shown below:
Material used to form the two columns: HDPE
Type of feeding to the columns: by gravity in the lower lateral sector of each column
Flow of charged organic: 8.2 m$^3$/hour
Average specific flow: 30 m$^3$/hour×m$^2$
Diameter and area of each column: 0.58 m and 0.27 m$^2$
Height of each column: 2.50 m
Type of filler (i.e., bed) material: strips of HDPE
Width of HDPE strips: 12 mm
Thickness of HDPE strips: 1 mm
Length of HDPE strips: variable
Average specific surface: 38 cm$^2$/gr.
Apparent density of the filler in the column: 0.05 t/m$^3$
Form of removal of the aqueous material accumulated: intermittent and/or continuous Table No. 5 presents the results obtained when the columns were operated continuously for a period of 13 days with checks made every 4 hours of operation.

TABLE NO. 5

EVALUATION OF THE PROCESS IN A PILOT PLANT
HAVING A CAPACITY 50 GALLONS PER MINUTE

| DAY OF OPERATION | AVERAGE RESIDUE CONTENT (ppm) ENTRANCE FIRST COLUMN | AVERAGE RESIDUE CONTENT (ppm) EXIT SECOND COLUMN | RESIDUE REMOVAL (%) |
|---|---|---|---|
| 1  | 850   | 50  | 94.12 |
| 2  | 1,092 | 158 | 85.53 |
| 3  | 1,183 | 100 | 91.55 |
| 4  | 1,125 | 150 | 86.67 |
| 5  | 1,517 | 92  | 93.94 |
| 6  | 1,225 | 158 | 87.10 |
| 7  | 1,125 | 133 | 88.18 |
| 8  | 733   | 117 | 84.04 |
| 9  | 792   | 133 | 83.21 |
| 10 | 858   | 117 | 86.36 |
| 11 | 850   | 75  | 91.18 |
| 12 | 350   | 25  | 92.86 |
| 13 | 675   | 50  | 92.59 |

These results demonstrate that with the present process it was possible to remove between 83% and 94% of the aqueous material contained in the initial flow of charged organic.

EXAMPLE NO. 4

Was carried out in a solvent extraction pilot plant having a capacity of 50 gallons per minute.

The process was evaluated by operating two columns in parallel. In this case the total flow of charged organic was divided into two equal streams, each independently feeding into a respective column. The filtered organics were subsequently joined, after which they proceed to the reextraction stage.

The bed material used in the column was strips of high density polyethylene.

The operating conditions for each column are shown below:

Construction material used to form the two columns: HDPE
Type of feeding to the columns: by gravity in the lower side
Flow of charged organic for each column: 4 $m^3$/hour
Average specific flow for each column: 15 $m^3$/hour×$m^2$
Diameter of each column: 0.58 m
Area of each column: 0.27 $m^2$
Height of each column: 2.5 m
Type of filler (i.e., bed) material: strips of HDPE
Width of HDPE strips: 12 mm
Thickness of HDPE strips: 1 mm
Length of HDPE strips: variable
Average specific surface: 38 $cm^2$/gr.
Apparent density of the filler in the column: 0.05 t/$m^3$
Form of removal of the aqueous material accumulated: intermittent and/or continuous Table No. 6 presents the principal average results obtained when the two columns were operated continuously for 8 days and with checks made every 4 hours of operation.

TABLE NO. 6

EVALUATION OF THE PROCESS IN A PILOT PLANT
HAVING A CAPACITY 50 GALLONS PER MINUTE

| DAY OF OPERATION | RESIDUE ENTERING THE COLUMN (ppm) | RESIDUE EXITING (ppm) COLUMN 1 | RESIDUE EXITING (ppm) COLUMN 2 | RESIDUE REMOVAL (%) COL 1 | RESIDUE REMOVAL (%) COL 2 |
|---|---|---|---|---|---|
| 1 | 550 | 142 | 117 | 74.18  | 78.73  |
| 2 | 758 | 100 | 67  | 86.81  | 91.16  |
| 3 | 750 | 75  | 33  | 90.00  | 95.60  |
| 4 | 525 | 0   | 0   | 100.00 | 100.00 |
| 5 | 692 | 58  | 17  | 91.62  | 97.54  |
| 6 | 758 | 92  | 25  | 87.86  | 96.70  |
| 7 | 817 | 75  | 75  | 90.82  | 90.82  |
| 8 | 650 | 33  | 0   | 94.92  | 100.00 |

These results demonstrate that with the circuit configuration described above it is also feasible to obtain very satisfactory results, with up to 100% of the aqueous material contained in the original organic being removed in the best cases.

As will be apparent to those skilled in the art, various modifications and adaptations of the embodiments described above will become readily apparent without departure from the spirit and scope of the invention, the scope of which is defined in the appended claims.

We claim:

1. A process for removing dispersed contaminating residues from an organic phase solution in a solvent extraction metallurgical process, comprising:

continuously introducing an organic phase solution which includes an acidic cycle and contains dispersed contaminating residues including particulate and aqueous residues through an inlet opening in a lower portion of a gravity-open, substantially vertical vessel means provided with a filtration bed comprising a plurality of elements formed of a material compatible with the acidic cycle of the organic phase solution, said elements defining a plurality of coalescing and filtration sites for inducing coalescence and mechanical retention of said dispersed particulate and aqueous contaminating residues thereon;

continuously advancing said organic phase solution upwardly through said coalescing and filtration sites of said filtration bed at a flow rate of between about 8 to 30 $m^3$/hr/$m^2$ to separate at least about 74 percent of said contaminating residues from said organic phase solution by coalescence and filtration upon said bed elements and settling of said coalesced aqueous residue downwardly through said filtration bed, said organic phase being at least partially purified thereby; and continuously withdrawing said purified organic phase solution from an outlet opening in an upper portion of said vessel and removing said separated aqueous residues from an outlet opening positioned below said inlet opening in the lower portion of said vessel.

2. The process of claim 1 which further comprises forming said plurality of elements from a material selected from the group consisting of plastic, polyvinyl chloride, nylon, polyethylene, polypropylene, polyester, teflon, acrylic, ceramics, glass, metal, and metal alloys.

3. The process of claim 1 which further comprises providing said elements with a shape selected from the group consisting of strings, netting, shavings, fragments, spirals, twists, scrap, strips and spheres.

4. The process of claim 3 wherein said bed is formed from elements all having substantially the same size and shape.

5. The process of claim 3 wherein said bed is formed from elements of varying shapes or sizes.

6. The process of claim 1 which further comprises accumulating said aqueous residue at the bottom of said vessel means and periodically removing said accumulated aqueous residue in batches.

7. The process of claim 1 which further comprises removing said aqueous residue continuously.

8. The process of claim 1 which further comprises washing said elements to remove contaminants trapped by said filtration bed.

9. The process of claim 1 which further comprises wetting the elements with an aqueous solution before introducing said organic phase solution into said bed to facilitate removal of said contaminating residues.

10. The process of claim 1 wherein the coalescing and filtration sites of said elements are arranged within at least one transport conduit for said organic phase solution.

11. A process for separating dispersed aqueous residues from an organic phase solution in a solvent extraction metallurgical process, comprising:

continuously introducing an organic phase solution which includes an acidic cycle and contains dispersed aqueous residues through an inlet opening in a lower portion of a vertical gravity-open column containing a filtration bed comprising a plurality of elements formed of a material compatible with the acidic cycle of the organic phase solution, said elements defining a plurality of coalescing sites for inducing coalescence of said dispersed aqueous residues thereon;

continuously advancing said organic phase solution upwardly through said coalescing sites of said column at a flow rate of between about 8 to 30 $m^3/hr/m^2$ to separate at least about 74 percent of said aqueous residues from said organic phase solution by coalescence upon said elements and settling of said coalesced aqueous residue downwardly through said filtration bed to produce an at least partially purified organic phase solution; and continuously withdrawing said purified organic phase solution from an outlet opening in an upper portion of said column and removing said separated aqueous residues from an outlet opening positioned below said inlet opening in the lower portion of said column.

12. The process of claim 11 wherein said bed has an apparent density ranging between about 0.02 and 0.20 gr/cc.

13. The process of claim 11 wherein said bed has a height of from about 2 to 5 times its diameter.

14. The process of claim 11 wherein the organic phase solution is passed through the bed at a flow rate of between about 15 to 30 $m^3/hr\times m^2$.

15. The process of claim 11 which further comprises removing said aqueous residues at a rate corresponding to their rate of coalescence upon said elements.

16. A process for separating dispersed aqueous residues from an organic phase solution in a solvent extraction metallurgical process, said separation process comprising:

continuously introducing an organic phase solution which includes an acidic cycle and contains dispersed aqueous residues through an inlet opening in a lower portion of a vertical gravity-open column having an upper end and a lower end containing a bed comprising a plurality of elements formed from a material selected from the group consisting of plastic, polyvinyl chloride, nylon, polyethylene, polypropylene, polyester, teflon, acrylic, ceramics, glass, metal, and metal alloys, said elements being compatible with the acidic cycle of the organic phase solution, having a shape selected from the group consisting of strings, netting, fragments, shavings, spirals, twists, scrap, strips and spheres, and defining a plurality of coalescing surfaces for inducing coalescence of said dispersed aqueous residues, thereon, said filtration bed having an apparent density ranging between about 0.02 and 0.20 gr/cc;

continuously advancing said organic phase solution from said lower end towards said upper end through said bed at a flow rate in the range of from about 8 to 30 $m^3/hr\times m^2$ to separate at least a percentage of said aqueous residues from said organic phase solution by coalescence upon said elements and settling of said aqueous residues downwardly through said bed to produce an at least partially purified organic phase solution; and continuously withdrawing said purified organic phase solution from an upper outlet of said column and continuously removing said separated aqueous residues from an outlet opening positioned below said inlet opening in the lower portion of said column.

17. The process of claim 16 which further comprises introducing said organic phase solution containing aqueous residues through a plurality of said columns arranged in series.

18. The process of claim 16 which further comprises introducing said organic phase solution containing aqueous residues through a plurality of said columns arranged in parallel.

19. The process of claim 16 which further comprises introducing said organic phase solution containing aqueous residues through a plurality of said columns arranged in series-parallel.

20. The process of claim 1, wherein said aqueous residues are present at a concentration of between about 400 to about 2,500 parts per million in said organic phase solution and said percentage is between about 78 to about 100 percent.

21. The process of claim 11, wherein said aqueous residues are present at a concentration of between about 400 to about 2,500 parts per million in said organic phase solution and said percentage is between about 78 to about 100 percent.

22. The process of claim 16, wherein said aqueous residues are present at a concentration of between about 400 to about 2,500 parts per million in said organic phase solution and said percentage is between about 78 to about 100 percent.

* * * * *